(12) United States Patent
Trivelpiece et al.

(10) Patent No.: US 11,594,115 B2
(45) Date of Patent: Feb. 28, 2023

(54) METHODS AND APPARATUSES FOR DETERMINING A POSITION OF A SECURITY TAG

(71) Applicant: Sensormatic Electronics, LLC, Boca Raton, FL (US)

(72) Inventors: Steve E. Trivelpiece, Rancho Santa Margarita, CA (US); Steven J. Raynesford, Mission Viejo, CA (US); David Torrecilla, San Sebastián de los Reyes (ES); Manuel A. Soto, Lake Worth, FL (US); Adam S. Bergman, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/476,167

(22) Filed: Sep. 15, 2021

(65) Prior Publication Data
US 2022/0084380 A1    Mar. 17, 2022

Related U.S. Application Data

(60) Provisional application No. 63/080,500, filed on Sep. 18, 2020, provisional application No. 63/079,755, filed on Sep. 17, 2020.

(51) Int. Cl.
*G08B 13/24* (2006.01)
*H04B 17/318* (2015.01)
*G06K 7/10* (2006.01)

(52) U.S. Cl.
CPC ..... *G08B 13/2462* (2013.01); *G06K 7/10297* (2013.01); *G08B 13/2417* (2013.01); *H04B 17/318* (2015.01)

(58) Field of Classification Search
CPC .................................................. G08B 13/2462
See application file for complete search history.

(56) References Cited

U.S. PATENT DOCUMENTS

| | | | |
|---|---|---|---|
| 6,970,097 B2 | 11/2005 | Welles, II et al. | |
| 7,446,662 B1* | 11/2008 | Somogyi | G08B 13/2485 340/10.41 |
| 2013/0316753 A1 | 11/2013 | Van Dijk et al. | |
| 2020/0134998 A1* | 4/2020 | Trivelpiece | G08B 13/2448 |

FOREIGN PATENT DOCUMENTS

| | | |
|---|---|---|
| CN | 108710814 B | 6/2021 |
| EP | 1447681 A2 | 8/2004 |

OTHER PUBLICATIONS

International Search Report and Written Opinion for International Patent Application No. PCT/US2021/071486, dated Mar. 31, 2022 (20 pages).

* cited by examiner

*Primary Examiner* — Travis R Hunnings
(74) *Attorney, Agent, or Firm* — ArentFox Schiff LLP

(57) ABSTRACT

Aspects of the present disclosure include methods, systems, and non-transitory computer readable media for receiving a magnetic signal from a magnetic signal transmitter, determining a strength of the magnetic signal at the security tag, receiving a radio frequency identification (RFID) interrogatory signal from a RFID scanner, and transmitting a RFID response signal, to the RFID scanner, indicating the strength of the magnetic signal.

24 Claims, 9 Drawing Sheets

900

METHODS AND APPARATUSES FOR DETERMINING A POSITION OF A SECURITY TAG

CROSS-REFERENCE TO RELATED APPLICATIONS

The current application claims priority to U.S. Provisional Application No. 63/079,755 filed on Sep. 17, 2020 and entitled "METHODS AND APPARATUSES FOR DETERMINING A POSITION OF A SECURITY TAG," and U.S. Provisional Application No. 63/080,500 filed on Sep. 18, 2020 and entitled "METHODS AND APPARATUSES FOR TRIGGERING A RFID LOGIC," the contents of which are hereby incorporated by reference in their entireties.

BACKGROUND

A radio frequency identification (RFID) system may include one or more RFID scanners, and a number of RFID tags each associated with one or more items of merchandise. The RFID system may be useful in managing inventory, tracking the items of merchandise, and/or loss prevention. In the RFID system, a RFID scanner may transmit a RFID interrogatory signal to a RFID tag. In response to receiving the RFID interrogatory signal, the RFID tag may transmit a RFID response signal back to the RFID scanner. However, the RFID scanner may be unable to accurately ascertain the location of the RFID tag based on the interrogatory RFID signal. For example, the RFID scanner (or reader) may be unable to accurately determine when the RFID tags are approaching the point of sale because the RFID scanner/reader may be unable to ascertain the location of the RFID tags. Therefore, improvements in RFID tag positioning may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Aspects of the present disclosure include methods, systems, and non-transitory computer readable media for receiving a magnetic signal from a magnetic signal transmitter, determining a strength of the magnetic signal at the security tag, receiving a radio frequency identification (RFID) interrogatory signal from a RFID scanner, and transmitting a RFID response signal, to the RFID scanner, indicating the strength of the magnetic signal.

An aspect of the present disclosure includes a method including receiving a magnetic signal from a magnetic signal transmitter, determining a strength of the magnetic signal at the security tag, receiving a radio frequency identification (RFID) interrogatory signal from a RFID scanner, and transmitting a RFID response signal, to the RFID scanner, indicating the strength of the magnetic signal.

Aspects of the present disclosure includes a security tag having a memory, a magnetic field sensing device configured to receive a magnetic signal from a magnetic signal transmitter and determine a strength of the magnetic signal at the security tag, and a radio frequency identification (RFID) device configured to receive a RFID interrogatory signal from a RFID scanner and transmit a RFID response signal, to the RFID scanner, indicating the strength of the magnetic signal.

Aspects of the present disclosure include methods, security tags, and non-transitory computer readable media for obtaining a transmission strength of a magnetic signal transmitted from a magnetic signal transmitter to the a security tag, transmitting a RFID interrogatory signal to the security tag from the RFID scanner, receiving a RFID response signal, from the security tag, indicating a reception strength of the magnetic signal received at the security tag, and determining a distance between the security tag and the magnetic signal transmitter based on the transmission strength of the magnetic signal and the reception strength of the magnetic signal.

Aspects of the present disclosure include methods, systems, and non-transitory computer readable media for transmitting an interrogatory magnetic signal to a RFID tag, receiving, from the RFID tag, a response magnetic signal in response to the interrogatory magnetic signal, determining whether the RFID tag is within a threshold distance based on the response magnetic signal, and performing a RFID logic or operation in response to determining that the RFID tag is within the threshold distance.

An aspect of the present disclosure includes a method including transmitting an interrogatory magnetic signal to a RFID tag, receiving, from the RFID tag, a response magnetic signal in response to the interrogatory magnetic signal, determining whether the RFID tag is within a threshold distance based on the response magnetic signal, and performing a RFID logic or operation in response to determining that the RFID tag is within the threshold distance.

Aspects of the present disclosure includes a RIFD system having a magnetic signal device configured to transmit an interrogatory magnetic signal to a RFID tag and receive, from the RFID tag, a response magnetic signal in response to the interrogatory magnetic signal, a RFID reader configured to determine whether the RFID tag is within a threshold distance based on the response magnetic signal and perform a RFID logic or operation in response to determining that the RFID tag is within the threshold distance.

Aspects of the present disclosure include non-transitory computer readable media for transmitting an interrogatory magnetic signal to a RFID tag, receiving, from the RFID tag, a response magnetic signal in response to the interrogatory magnetic signal, determining whether the RFID tag is within a threshold distance based on the response magnetic signal, and performing a RFID logic or operation in response to determining that the RFID tag is within the threshold distance.

Aspects of the present disclosure include methods, RFID tags, and non-transitory computer readable media for receiving an indication from a magnetic signal device indicating that a RFID tag is within a threshold distance of the magnetic signal device and performing a RFID logic or operation in response to receiving the indication indicating that the RFID tag is within the threshold distance.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness.

The disclosure itself, however, as well as a preferred mode of use, further objects and advantages thereof, will be best understood by reference to the following detailed description of illustrative aspects of the disclosure when read in conjunction with the accompanying drawings, wherein.

DETAILED DESCRIPTION

Figure 1:
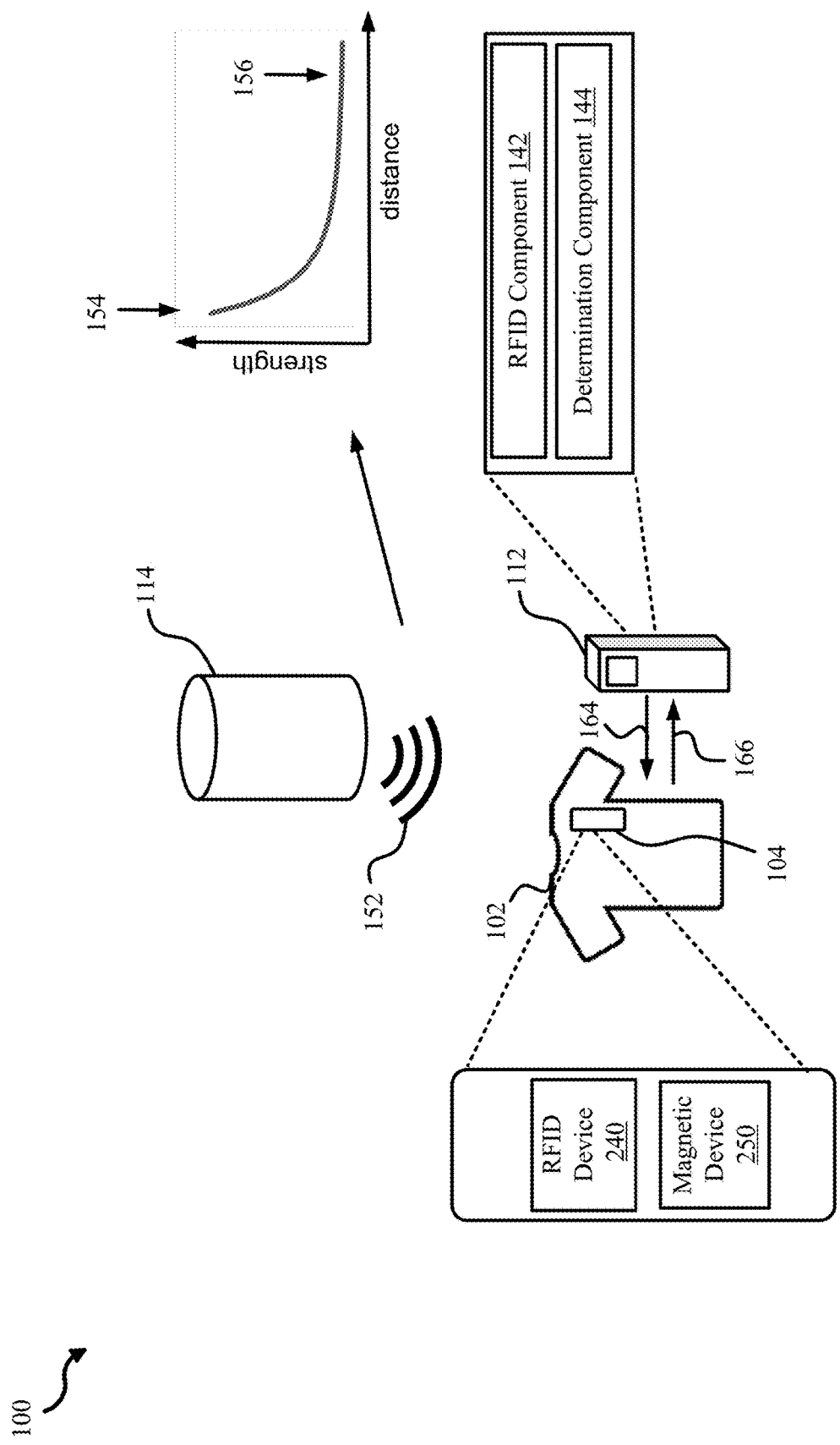
FIG. 1 illustrates an example of an environment for determining a position of a security tag in accordance with aspects of the present disclosure.

The following includes definitions of selected terms employed herein. The definitions include various examples and/or forms of components that fall within the scope of a term and that may be used for implementation. The examples are not intended to be limiting.

In some implementations, a radio frequency identification (RFID) system may be useful in a retail store. For example, the RFID scanner may track and/or manage a security tag associated with an item of merchandise (e.g., whether the item of merchandise is still in the store or has been sold, electronically update the price of the item of merchandise, electronically update the item of merchandise information, etc.). In some instances, it may be useful for the RFID scanner to track the physical position of the security tag (and the attached item of merchandise). For example, it may be desirable for the retail store to track the physical position of the security tag (and the attached item of merchandise) to prevent theft (e.g., intentional removal of the item of merchandise without proper payment), loss (accidental removal of the item of merchandise), or other unauthorized removal of items of merchandise.

However, it may be difficult for the RFID scanner to track the physical position of the security tag within retail store because interference, obstruction, and other effects may obscure the RFID signal transmission/reception between the RFID scanner and the security tag. When the RFID scanner transmits a RFID signal to the security tag, the security tag may be unable to use the strength of the received RFID signal to assess the distance between the RFID scanner and the security tag.

In some aspects of the present disclosure, the RFID system may include the RFID scanner, a magnetic signal transmitter, and at least one security tag. The magnetic signal transmitter may include a magnetic driver configured to transmit a magnetic signal to the security tag. The strength of the magnetic signal may diminish as the magnetic signal propagates from the magnetic signal transmitter to the security tag. The security tag may include a RFID device and a magnetic device. The magnetic device may be configured to receive the magnetic signal. The magnetic device may be configured to determine the strength of the magnetic signal received at the security tag. The RFID scanner may transmit a RFID interrogatory signal to the security tag. In response, the security tag may transmit a RFID response signal to indicate the strength of the magnetic signal determined at the security tag. The RFID scanner may determine a distance between the security tag and the magnetic device based on the strength of the magnetic signal.

In some instances, if an item of merchandise (with the security tag attached) moves beyond a threshold distance (e.g., outside of the retail store) without proper payment, the RFID scanner may detect an unauthorized removal of the item of merchandise. An advantage of the RFID system described in the disclosure includes utilizing existing magnetic signal transmitters in retail stores to track the security tags.

In the current application, position may include a precise location or a relative distance from at least one reference point (e.g., a magnetic signal transmitter).

In an example implementation according to aspects of the present disclosure, certain actions taken by the RFID reader may be triggered when the RFID tags are within a certain distance of the RFID reader. As stated above, it may be difficult for the RFID reader to track the physical position of the RFID tag within retail store because interference, obstruction, and other effects may obscure the RFID signal transmission/reception between the RFID reader and the RFID tag. Without the ability to accurately track the physical position, the RFID reader may continuously transmit interrogatory signals to communicate with the RFID tags. However, regulatory restrictions and environmental policies may prevent the RFID reader from continuously transmitting interrogatory signals.

In some aspects of the present disclosure, the RFID system may include the RFID reader, the magnetic signal device, and at least one RFID tag. The magnetic signal device may transmit one or more interrogatory magnetic signals. In response to receiving at least one of the one or more interrogatory magnetic signals, the RFID tag may transmit a response magnetic signal back to the magnetic signal device. Based on the response magnetic signal, the RFID system may determine that the RFID tag is within a threshold distance of the RFID system (or a component of the RFID system). In response, the RFID reader may be triggered to perform a logic. Examples of the logic includes updating inventory, completing a sale, etc.

Referring to FIG. 1, in a non-limiting implementation, an example of an environment 100 (e.g., a retail store) for determining a position of a security tag may include a security tag 104 attached to the item of merchandise 102. The security tag 104 may include a RFID device 240 configured to transmit and/or receive RFID signals. The security tag 104 may include a magnetic field sensing device 250 configured to transmit and/or receive magnetic signals (e.g., electro-magnetic signals or acousto-magnetic signals). The magnetic field sensing device 250 may be configured to measure the strength of the magnetic signals received at the security tag 104. In some implementations, the RFID device 240 and the magnetic field sensing device 250 may be separate devices (e.g., separate semiconductor chips). In other implementations, the RFID device 240 and the magnetic field sensing device 250 may be integrated into a single device (e.g., a single semiconductor chip).

In an aspect, the environment 100 may include a magnetic signal transmitter 114 configured to transmit a magnetic signal having a transmission strength at the magnetic signal transmitter 114 and a reception strength, less than the transmission strength, at the security tag 104. The magnetic signal transmitter 114 may be configured to encode a unique identifier of the magnetic signal transmitter 114 into the magnetic signal. For example, the magnetic signal transmitter 114 may encode the unique identifier into a waveform (frequency, shape of wave, amplitude, phase, etc.) of the magnetic signal. If the environment 100 includes multiple magnetic signal transmitters, each may transmit a unique waveform indicating the associated unique identifier. For example, the first transmitter may transmit square waves and the second transmitter may transmit triangular waves. In another example, the first transmitter may transmit a first amplitude modulated magnetic signal indicating a first identifier of "01," and the second transmitter may transmit a second amplitude modulated signal indicating a second identifier of "10."

In one aspect of the present disclosure, the environment 100 may include a RFID scanner 112 configured to transmit and/or receive RFID signals. The RFID scanner 112 may include a RFID component 142 configured to transmit and/or receive RFID signals. The RFID scanner 112 may include a determination component 144 configured to determine a distance between the security tag 104 and a magnetic signal transmitter 114 based on the strengths of the magnetic signal at the magnetic signal transmitter 114 and at the security tag 104. One or more of the RFID component 142 and/or the determination component 144 may be configured as hardware (e.g., application specific integrated circuit, application processors, field programmable gate arrays, etc.), software (e.g., instructions stored in a memory executed by a processor of the RFID scanner 112), or a combination thereof.

During operation, in some instances, the magnetic signal transmitter 114 may transmit a magnetic signal 152 having a transmission strength 154 at the magnetic signal transmitter 114 to the security tag 104. The strength of the magnetic signal 152 may decrease as the magnetic signal 152 propagates from the magnetic signal transmitter 114 to the security tag 104. In one example, the strength of the magnetic signal 152 may decrease as a function of the propagation distance. Specifically, the strength of the magnetic signal 152 may decrease as an inverse cubic function of the propagation distance. For example, as the magnetic signal 152 propagates from a distance of l to a distance of 2 l, the strength of the magnetic signal 152 may decrease by a factor of 8. As the magnetic signal 152 reaches the security tag 104, the magnetic signal 152 may have a reception strength 156.

In some implementations, the magnetic field sensing device 250 of the security tag 104 may receive the magnetic signal 152 having the reception strength 156. The magnetic field sensing device 250 of the security tag 104 may determine a value of the reception strength 156 of the magnetic signal 152. For example, the security tag 104 may measure an amplitude, an instantaneous power level, and/or an average power level of the magnetic signal 152.

In certain implementations, the RFID component 142 of the RFID scanner 112 may transmit an interrogatory RFID signal 164 to the RFID device 240 of the security tag 104. In response, the RFID component 142 of the RFID scanner 112 may receive a response RFID signal 166 including a value associated with the reception strength 156 of the magnetic signal 152. For example, the response RFID signal 166 may include a value representing the amplitude, the instantaneous power level, and/or the average power level of the magnetic signal 152.

In some variations, the determination component 144 of the RFID scanner 112 may determine the distance between the security tag 104 and the magnetic signal transmitter 114 based on the transmission strength 154 and the reception strength 156 of the magnetic signal 152. For example, the determination component 144 of the RFID scanner 112 may compute the distance between the security tag 104 and the magnetic signal transmitter 114 by subtracting the value of the transmission strength 154 by the value of the reception strength 156. The determination component 144 may compute the square root (for far field radiation) or cube root (for near field radiation) of the difference between the value of the transmission strength 154 by the value of the reception strength 156 to obtain the distance between the security tag 104 and the magnetic signal transmitter 114. In one instance, the determination component 144 may obtain the value of the transmission strength 154 from the magnetic signal transmitter 114. The magnetic signal transmitter 114 may transmit the value of the transmission strength 154 to the RFID scanner 112. The determination component 144 may obtain the value of the transmission strength 154 from a server (not shown). The value of the transmission strength 154 may be input into the RFID scanner 112.

Figure 2:
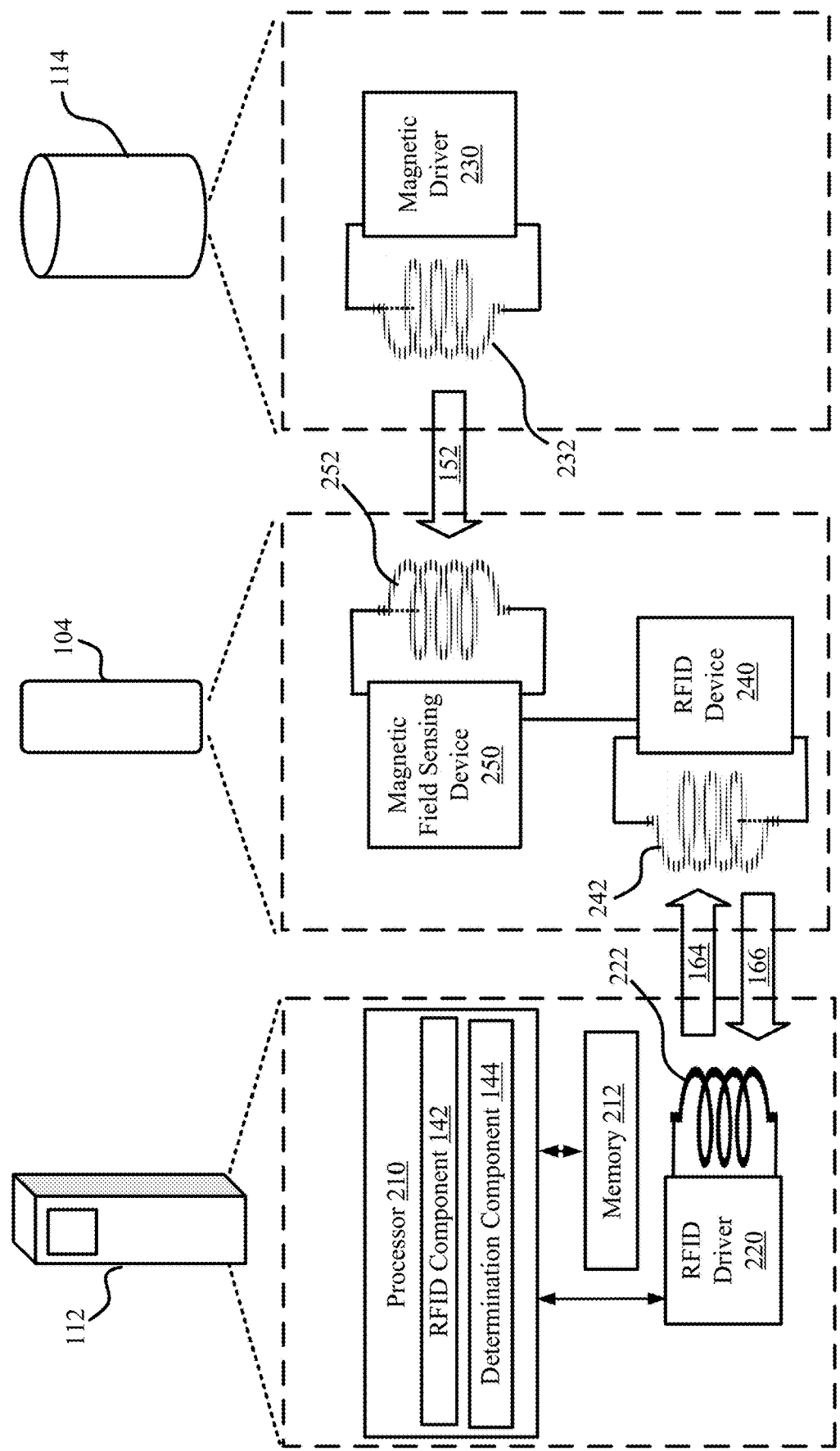
FIG. 2 illustrates an example of a radio frequency identification (RFID) scanner and a security tag in accordance with aspects of the present disclosure.

Referring to FIGS. 1 and 2, an example of the RFID scanner 112 may be configured to transmit the interrogatory RFID signal 164 and/or receive the response RFID signal 166. The RFID scanner 112 may include a processor 210 that executes instructions stored in a memory 212 for determining the distance based on the magnetic signal strength as described herein. The RFID scanner 112 may include the memory 212.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein. The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

In some implementations, the RFID scanner 112 may include a RFID driver 220 configured to transmit and/or receive RFID signals via a scanner coil 222. The RFID scanner 112 may include the scanner coil 222.

In some implementations, the processor 210 may include the RFID component 142 that causes the RFID driver 220 to transmit the interrogatory RFID signal 164, via a scanner coil 222, to the security tag 104. The RFID driver 220 may energize the scanner coil 222 to transmit the interrogatory RFID signal 164. The scanner coil 222 may include one or more inductors that transmit or receive electromagnetic signals. Alternatively or additionally, the scanner coil 222 may be a dipole antenna.

In certain implementations, the processor 210 may include the determination component 144 that determines the distance between the security tag 104 and the magnetic signal transmitter 114 based on the transmission strength and the reception strength of the magnetic signal 152.

In some implementations, the magnetic signal transmitter 114 may include a magnetic driver 230 that transmits the magnetic signal 152 via the transmitter coil 232. The magnetic signal transmitter 114 may include a transmitter coil 232 for transmitting the magnetic signal 152.

Additionally, in some non-limiting examples, the security tag 104 may include the RFID device 240 that transmits the response RFID signal 166 and/or receives the interrogatory RFID signal 164 via a tag coil 242. The security tag 104 may include the magnetic field sensing device 250 that receives the magnetic signal 152 via a magnetic coil 252. The security tag 104 may include the tag coil 242 for transmitting the response RFID signal 166 and/or receiving the interrogatory RFID signal 164 via the tag coil 242. The security tag 104 may include the magnetic coil 252 for receiving the magnetic signal 152.

During operation, in some implementations, the processor 210, the memory 212, the RFID component 142, the determination component 144, the RFID driver 220, and/or the scanner coil 222 may obtain the transmission strength 154 of the magnetic signal 152 transmitted from the magnetic signal transmitter 114 to the security tag 104. For example, the determination component 144 may obtain the transmission strength 154 stored in the memory 212.

In some implementations, the magnetic driver 230 of the magnetic signal transmitter 114 may transmit the magnetic signal 152 to the security tag 104 via the transmitter coil 232. The magnetic field sensing device 250 and/or magnetic coil 252 may receive the magnetic signal 152 from the magnetic signal transmitter 114. The magnetic driver 230 may transmit a transmitter identification associated with the magnetic signal transmitter 114 to indicate the source of the magnetic signal 152. The modulation of the magnetic signal 152 may indicate the transmitter identification.

In an implementation, the magnetic field sensing device 250 may determine the reception strength 156 of the magnetic signal 152 at the security tag 104. In some instances, the magnetic field sensing device 250 may utilize hardware and/or software known to one skilled in the art to determine the reception strength 156. For example, the magnetic field sensing device 250 may include a wattmeter to measure the power level of the magnetic signal 152. In another example, the magnetic field sensing device 250 may include an ammeter and/or a voltmeter to measure the magnetic signal 152.

In some instances, the processor 210, the memory 212, the RFID component 142, the RFID driver 220, and/or the scanner coil 222 may transmit the RFID interrogatory signal 164 to the security tag 104 from the RFID scanner 112. The RFID device 240 and/or the tag coil 242 may receive the RFID interrogatory signal 164 from the RFID scanner 112.

In some examples, the RFID device 240 and/or the tag coil 242 may transmit the RFID response signal 166, to the RFID scanner 112, indicating the reception strength 156 of the magnetic signal 152. The processor 210, the memory 212, the RFID component 142, the RFID driver 220, and/or the scanner coil 222 may receive the RFID response signal 166, from the security tag 104, indicating the reception strength 156 of the magnetic signal 152 received at the security tag 104.

In an implementation, the processor 210, the memory 212, and/or the determination component 144 may determine a distance between the security tag 104 and the magnetic signal transmitter 114 based on the transmission strength 154 of the magnetic signal 152 and the reception strength 156 of the magnetic signal 152.

Figure 3:
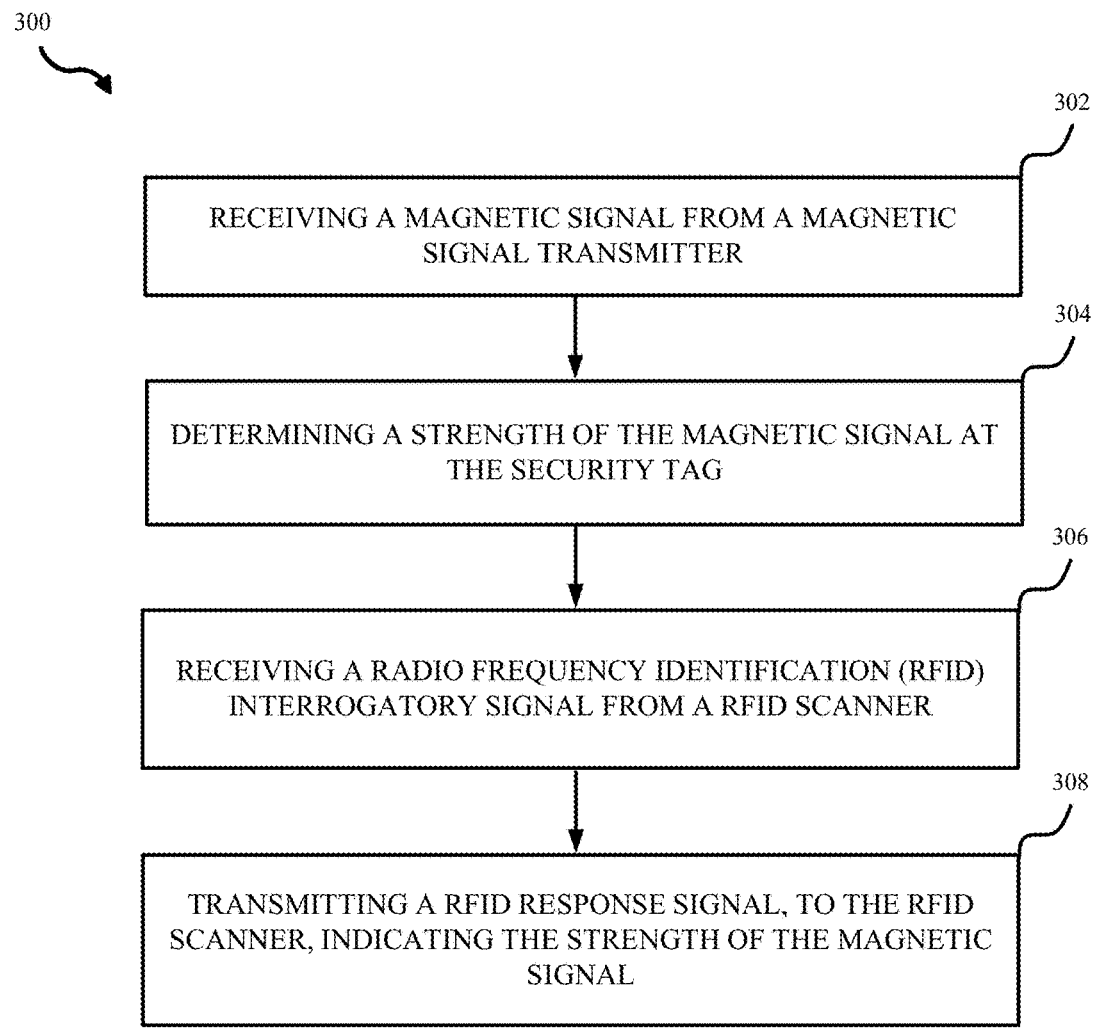
FIG. 3 illustrates an example of a method for receiving a magnetic signal for determining a position of a security tag accordance with aspects of the present disclosure.

Turning to FIG. 3, an example of a method 300 for determining and/or reporting a reception strength of a magnetic signal may be performed by the security tag 104 and/or one or more of the RFID device 240, the tag coil 242, the magnetic field sensing device 250, and/or the magnetic coil 252.

At block 302, the method 300 may receive a magnetic signal from a magnetic signal transmitter. For example, the magnetic field sensing device 250 and/or magnetic coil 252 may receive the magnetic signal 152 from the magnetic signal transmitter 114 as described above. The magnetic field sensing device 250 and/or magnetic coil 252 may be configured to and/or define means for receiving a magnetic signal from a magnetic signal transmitter.

At block 304, the method 300 may determine a strength of the magnetic signal at the security tag. For example, the magnetic field sensing device 250 may determine the reception strength 156 of the magnetic signal 152 at the security tag 104 as described above. The magnetic field sensing device 250 may be configured to and/or define means for determining a strength of the magnetic signal at the security tag.

At block 306, the method 300 may receive a radio frequency identification (RFID) interrogatory signal from a RFID scanner. For example, the RFID device 240 and/or the tag coil 242 may receive the RFID interrogatory signal 164 from the RFID scanner 112 as described above. The RFID device 240 and/or the tag coil 242 may be configured to and/or define means for receiving a radio frequency identification (RFID) interrogatory signal from a RFID scanner.

At block 308, the method 300 may transmit a RFID response signal, to the RFID scanner, indicating the strength of the magnetic signal. For example, the RFID device 240 and/or the tag coil 242 may transmit the RFID response signal 166, to the RFID scanner 112, indicating the reception strength 156 of the magnetic signal 152 as described above. The RFID device 240 and/or the tag coil 242 may be configured to and/or define means for transmitting a RFID response signal, to the RFID scanner, indicating the strength of the magnetic signal.

Figure 4:
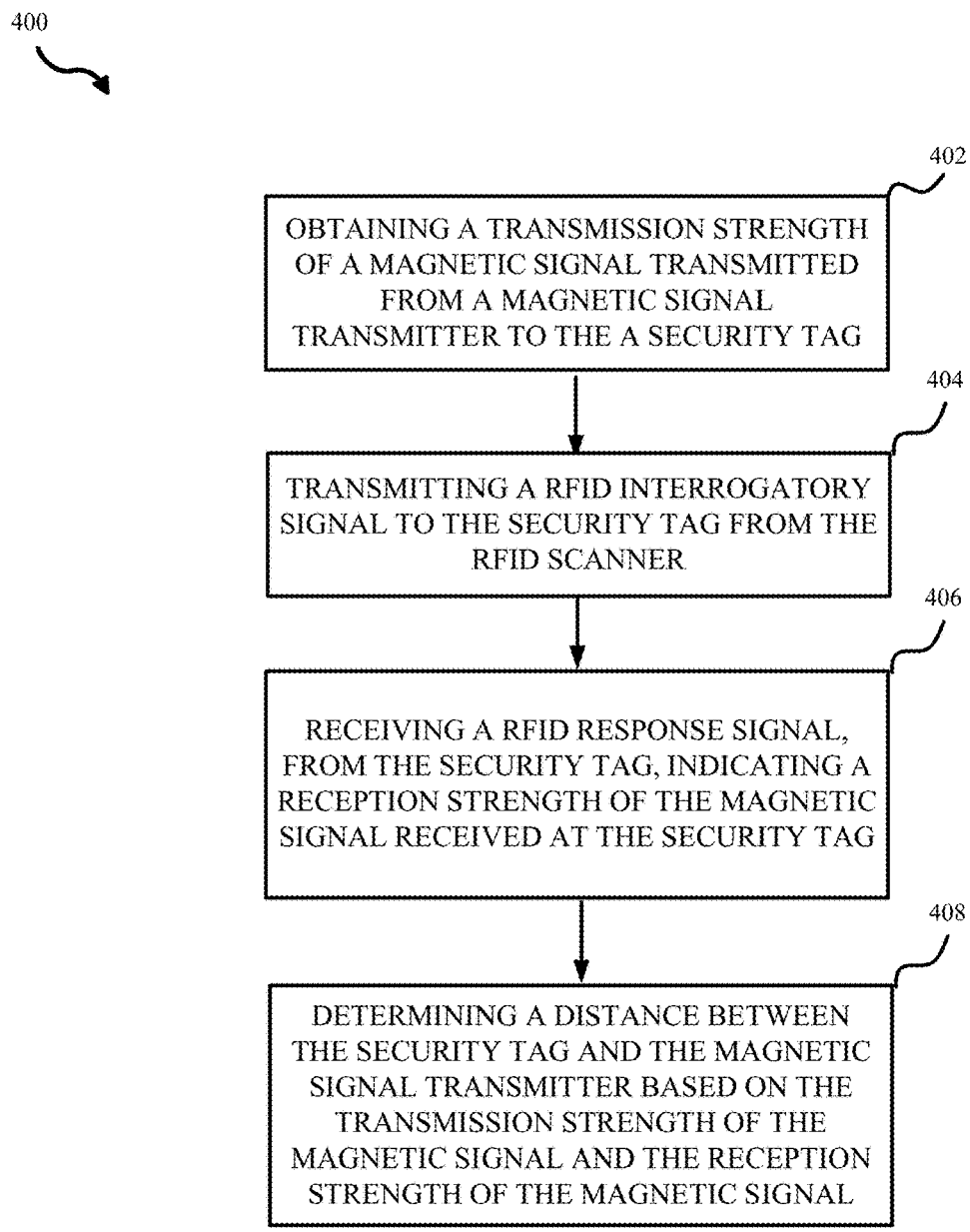
FIG. 4 illustrates an example of a method for determining a position of a security tag in accordance with aspects of the present disclosure.

Turning to FIG. 4, an example of a method 400 for determining a distance between the magnetic signal transmitter and a security tag may be performed by the processor 210, the memory 212, the RFID component 142, the determination component 144, the RFID driver 220, and/or the scanner coil 222 of the RFID scanner 112.

At block 402, the method 400 may obtain a transmission strength of a magnetic signal transmitted from a magnetic signal transmitter 114 to a the security tag 104. For example, the processor 210, the memory 212, the RFID component 142, the determination component 144, the RFID driver 220, and/or the scanner coil 222 may obtain the transmission strength 154 of the magnetic signal 152 transmitted from the magnetic signal transmitter 114 to the security tag 104. For example, the determination component 144 may obtain the transmission strength 154 stored in the memory 212 as described above. In one example, the determination component 144 may obtain the transmission strength 154 from the memory 212. The processor 210, the memory 212, the RFID component 142, the determination component 144, the RFID driver 220, and/or the scanner coil 222 may be configured to and/or define means for obtaining a transmission strength of a magnetic signal transmitted from a magnetic signal transmitter to the a security tag.

At block 404, the method 400 may transmit a RFID interrogatory signal to the security tag from the RFID scanner. For example, the processor 210, the memory 212, the RFID component 142, the RFID driver 220, and/or the scanner coil 222 may transmit the RFID interrogatory signal 164 to the security tag 104 from the RFID scanner 112. The processor 210, the memory 212, the RFID component 142, the RFID driver 220, and/or the scanner coil 222 may be configured to and/or define means for transmitting a RFID interrogatory signal to the security tag from the RFID scanner.

At block 406, the method 400 may receive a RFID response signal, from the security tag, indicating a reception strength of a magnetic signal received at the security tag. For example, the processor 210, the memory 212, the RFID component 142, the RFID driver 220, and/or the scanner coil 222 may receive the RFID response signal 166, from the security tag 104, indicating the reception strength 156 of the magnetic signal 152 received at the security tag 104. The processor 210, the memory 212, the RFID component 142, the RFID driver 220, and/or the scanner coil 222 may be configured to and/or define means for receiving a RFID response signal, from the security tag, indicating a reception strength of the magnetic signal received at the security tag.

At block 408, the method 400 may determine a distance between the security tag and the magnetic signal transmitter based on the transmission strength of the magnetic signal and the reception strength of the magnetic signal. For example, the processor 210, the memory 212, and/or the determination component 144 may determine a distance between the security tag 104 and the magnetic signal transmitter 114 based on the transmission strength 154 of the magnetic signal 152 and the reception strength 156 of the magnetic signal 152. The processor 210, the memory 212, and/or the determination component 144 may be configured to and/or define means for determining a distance between the security tag and the magnetic signal transmitter based on the transmission strength of the magnetic signal and the reception strength of the magnetic signal.

In one aspect of the present disclosure, the RFID scanner 112 may determine a precise or approximate position of the security tag 104 based on more than one distance determinations. For example, if the RFID scanner 112 determines that the security tag 104 is a first distance from a first magnetic signal transmitter, a second distance from a second magnetic signal transmitter, and a third distance from a third magnetic signal transmitter, the RFID scanner 112 may be able to determine a precise position, based on triangulation, of the security tag 104.

In a different aspect of the present disclosure, the RFID scanner 112 may track the shopping habit and/or preference of a customer.

Figure 5:
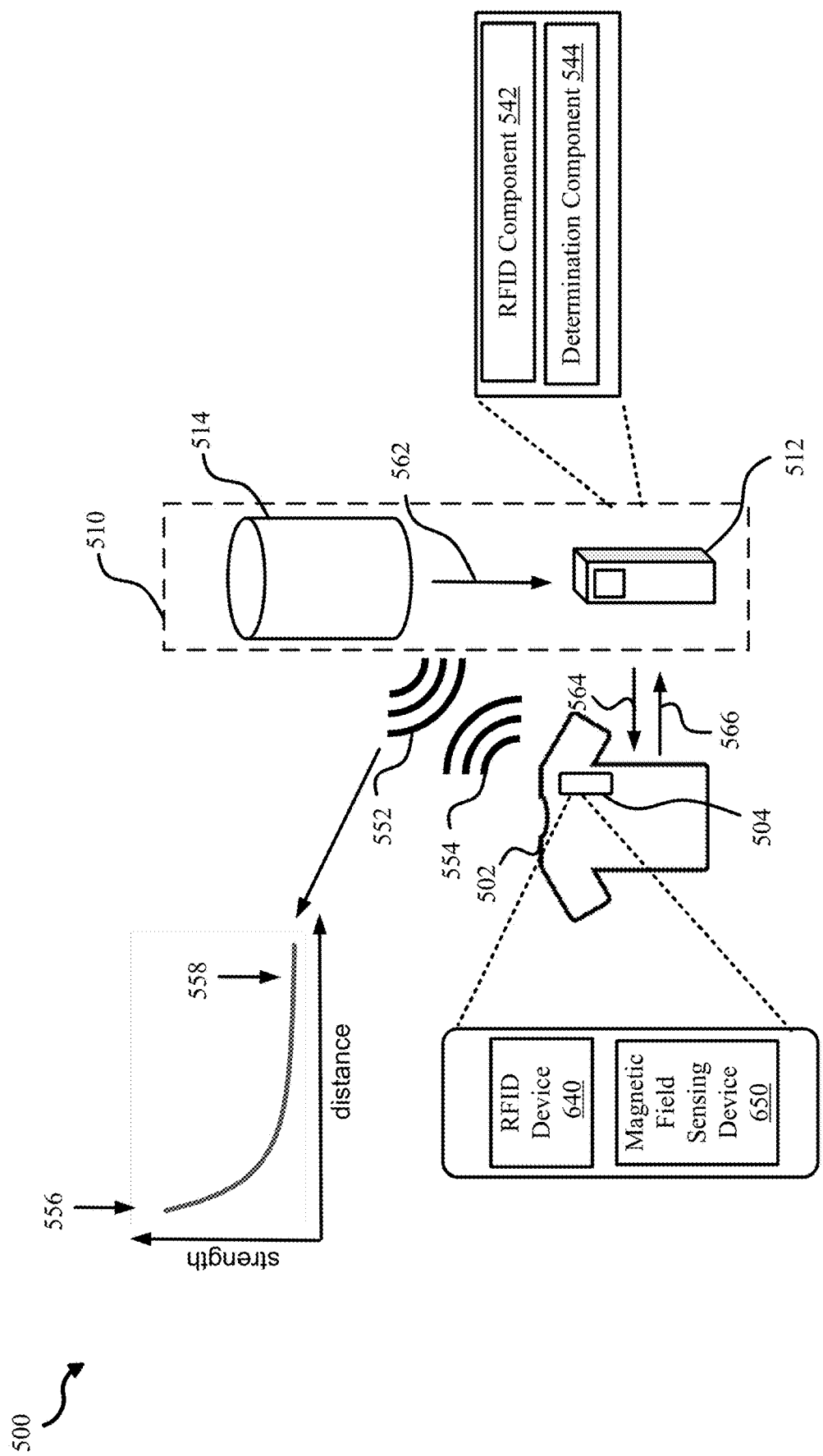
FIG. 5 illustrates an example of an environment for triggering a radio frequency identification (RFID) logic or operation in accordance with aspects of the present disclosure.

Referring to FIG. 5, in a non-limiting example implementing the system described above, an example of an environment 500 (e.g., a retail store) for triggering a RFID logic may include a RFID tag 504 attached to a merchandise item 502. The RFID tag 504 may include a RFID device 640 configured to transmit and/or receive RFID signals. The RFID tag 504 may include a magnetic field sensing device 650 configured to transmit and/or receive magnetic signals (e.g., electro-magnetic signals or acousto-magnetic signals). The magnetic field sensing device 650 may be configured to measure the strength of the magnetic signals received at the RFID tag 504. In some implementations, the RFID device 640 and the magnetic field sensing device 650 may be separate devices (e.g., separate semiconductor chips). In other implementations, the RFID device 640 and the magnetic field sensing device 650 may be integrated into a single device (e.g., a single semiconductor chip).

In an aspect, the environment 500 may include a magnetic signal device 514 configured to transmit a magnetic signal having a transmission strength, at the magnetic signal device 514, and a reception strength, less than the transmission strength, at the RFID tag 504.

In one aspect of the present disclosure, the environment 500 may include a RFID reader 512 configured to transmit and/or receive RFID signals. The RFID reader 512 may include a RFID component 542 configured to transmit and/or receive RFID signals. In some instances, the RFID component 542 may be configured to perform a logic when the RFID tag 504 is within a threshold distance of the magnetic signal device 514. The RFID reader 512 may include a determination component 544 configured to determine a distance between the RFID tag 504 and a magnetic signal device 514 based on the strengths of the transmitted magnetic signal at the magnetic signal device 514 and the received magnetic signal at the RFID tag 504. One or more of the RFID component 542 and/or the determination component 544 may be configured as hardware (e.g., application specific integrated circuit, application processors, field programmable gate arrays, etc.), software (e.g., instructions stored in a memory executed by a processor of the RFID reader 512), or a combination thereof.

In some examples, the magnetic signal device 514 and the RFID reader 512 may be separate devices. In other instances, the magnetic signal device 514 and the RFID reader 512 may be integrated as a single device. The magnetic signal device 514 and the RFID reader 512 may be part of a RFID system 510.

During operation, in some instances, the magnetic signal device 514 may transmit an interrogatory magnetic signal 552 having a transmission strength 556 at the magnetic signal device 514 to the RFID tag 504. The strength of the interrogatory magnetic signal 552 may decrease as the interrogatory magnetic signal 552 propagates from the magnetic signal device 514 to the RFID tag 504. In one example, the strength of the interrogatory magnetic signal 552 may decrease as a function of the propagation distance. Specifically, the strength of the interrogatory magnetic signal 552 may decrease as an inverse cubic function of the propagation distance. For example, as the interrogatory magnetic signal 552 propagates from a distance of 1 to a distance of 6 1, the strength of the interrogatory magnetic signal 552 may decrease by a factor of 8. As the interrogatory magnetic signal 552 reaches the RFID tag 504, the interrogatory magnetic signal 552 may have a reception strength 558.

In some implementations, the magnetic field sensing device 650 of the RFID tag 504 may receive the interrogatory magnetic signal 552 having the reception strength 558. The magnetic field sensing device 650 of the RFID tag 504 may determine a value of the reception strength 558 of the interrogatory magnetic signal 552. For example, the RFID tag 504 may measure an amplitude, an instantaneous power level, and/or an average power level of the interrogatory magnetic signal 552. The magnetic field sensing device 650 of the RFID tag 504 may transmit a response magnetic signal 554 to the magnetic signal device 514. The response magnetic signal 554 may indicate the value of the reception strength 558 of the interrogatory magnetic signal 552.

In one aspect of the present disclosure, the magnetic signal device 514 may receive the response magnetic signal 554. The magnetic signal device 514 may transmit an indication 562 to the RFID reader 512. The indication 562 may include the value of the of reception strength 558 of the interrogatory magnetic signal 552.

In some variations, the determination component 544 of the RFID reader 512 may determine the distance between the RFID tag 504 and the magnetic signal device 514 based on the transmission strength 556 and the reception strength 558 of the interrogatory magnetic signal 552. For example, the determination component 544 of the RFID reader 512 may compute the distance between the RFID tag 504 and the magnetic signal device 514 by subtracting the value of the transmission strength 556 by the value of the reception strength 558. The determination component 544 may compute the square root (for far field radiation) or cube root (for near field radiation) of the difference between the value of the transmission strength 556 by the value of the reception strength 558 to obtain the distance between the RFID tag 504 and the magnetic signal device 514. In one instance, the determination component 544 may obtain the value of the transmission strength 556 from the magnetic signal device 514. The magnetic signal device 514 may transmit the value of the transmission strength 556 to the RFID reader 512. The determination component 544 may obtain the value of the transmission strength 556 from a server (not shown). The value of the transmission strength 556 may be input into the RFID reader 512.

In an implementation, the determination component 544 may determine that the RFID tag 504 is within a threshold distance from the magnetic signal device 514 based on the transmission strength 556 and the reception strength 558 of the interrogatory magnetic signal 552. In response, the RFID component 542 may be triggered to perform one or more logics and/or operations associated with the merchandise item 502, the RFID tag 504, and/or the RFID reader 512. For example, the RFID component 542 may transmit an interrogatory RFID signal 564 and/or receive a response RFID signal 566. In one aspect, the RFID component 542 may transmit the interrogatory RFID signal 564 to the RFID tag 504 to obtain one or more of merchandise information associated with the merchandise item 502 (e.g., return information, inventory availability of similar items, etc.), tag information (e.g., tag identification associated with the RFID tag 504, information stored in the memory of the RFID tag 504, etc.), and/or pricing information (e.g., price, any sale or promotion, etc.). In another aspect, the RFID component 542 may transmit the interrogatory RFID signal 564 to store information onto the RFID tag 504, delete information from the RFID tag 504, disable or enable the RFID tag 504, or perform other logics and/or operations.

In an aspect, the RFID reader 512 may transmit an unlocking signal to the RFID tag 504 to unlock the RFID tag 504 from the merchandise item 502.

In some aspects, the RFID reader 512 may perform logics and/or operations involving other devices, such as external servers (not shown).

In a different aspect, the magnetic signal device 514 may receive the response magnetic signal 554, and determine the distance between the RFID tag 504 and the magnetic signal device 514. If the distance is less than the threshold distance, the magnetic signal device 514 may transmit the indication 562 to the RFID reader 512 to trigger the RFID component 542 and/or the RFID reader to perform the logics and/or operations described above.

Figure 6:
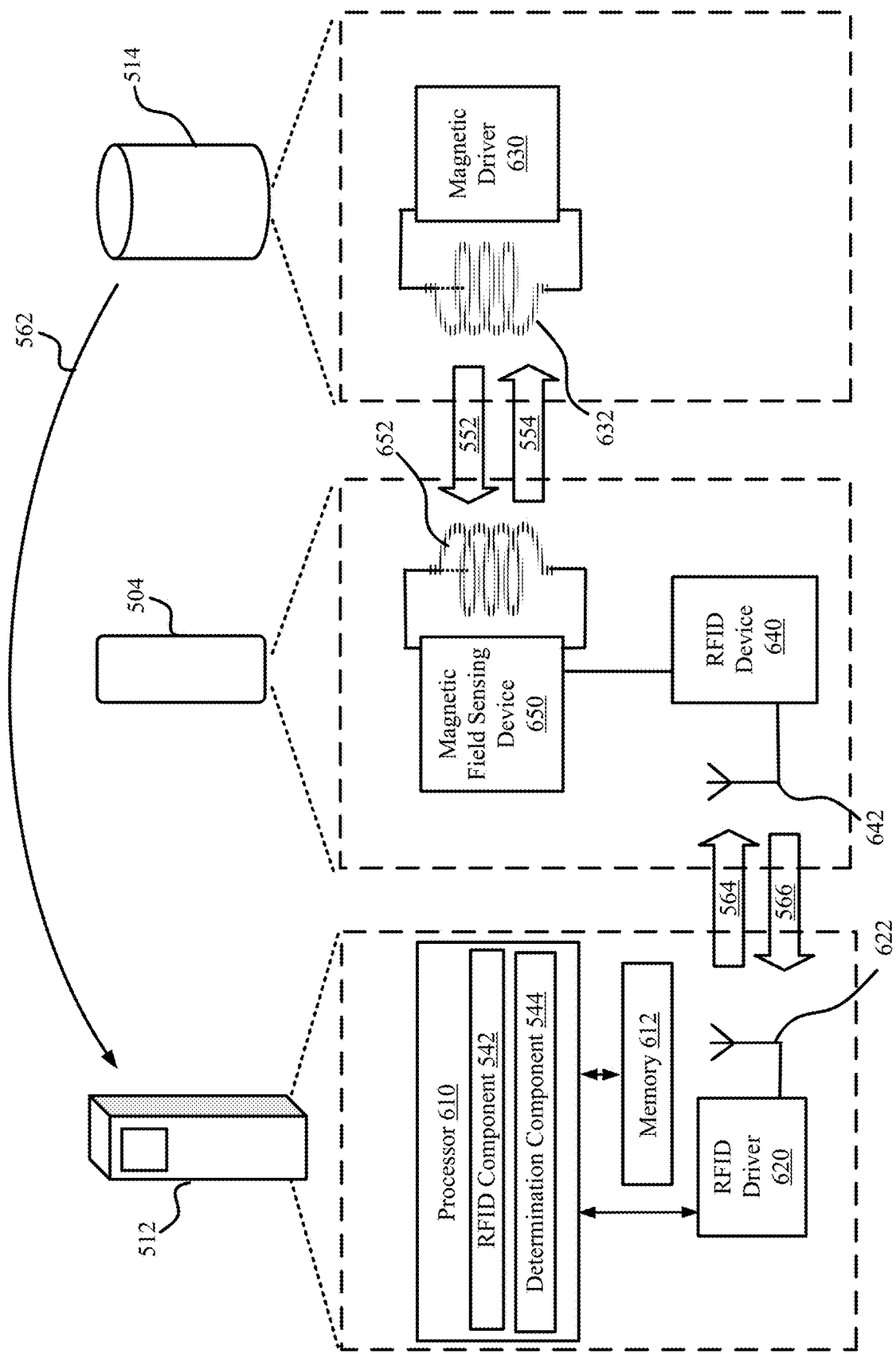
FIG. 6 illustrates examples of a RFID reader, a magnetic signal device, and a RFID tag in accordance with aspects of the present disclosure.

Referring to FIGS. 5 and 6, an example of the RFID reader 512 may include a processor 610 that executes instructions stored in a memory 612 for determining the distance based on the magnetic signal strength as described herein. The RFID reader 512 may include the memory 612.

In some implementations, the RFID reader 512 may include a RFID driver 620 configured to transmit and/or receive RFID signals via a reader antenna 622. The RFID reader 512 may include the reader antenna 622.

In some implementations, the processor 610 may include the RFID component 542 that causes the RFID driver 620 to transmit the interrogatory RFID signal 564, via a reader antenna 622, to the RFID tag 504. The RFID driver 620 may energize the reader antenna 622 to transmit the interrogatory RFID signal 564. The reader antenna 622 may include one or more inductors that transmit or receive electromagnetic signals. The reader antenna 622 may be a dipole antenna. The RFID component 542 may be triggered to perform logics and/or operations when the RFID tag 504 is within the threshold distance of the magnetic signal device 514.

In certain implementations, the processor 610 may include the determination component 544 that determines the distance between the RFID tag 504 and the magnetic signal device 514 based on the transmission strength and the reception strength of the interrogatory magnetic signal 552.

In some implementations, the magnetic signal device 514 may include a magnetic driver 630 that transmits the interrogatory magnetic signal 552 via the transmitter coil 632. The magnetic driver 630 may be optionally configured to determine the distance between the RFID tag 504 and the magnetic signal device 514 based on the transmission strength and the reception strength of the interrogatory magnetic signal 552. The magnetic driver 630 may be optionally configure to transmit the indication 562 to the RFID reader 512.

Additionally or alternatively, in some non-limiting examples, the RFID tag 504 may include the RFID device 640 that transmits the response RFID signal 566 and/or receives the interrogatory RFID signal 564 via a tag antenna 642. The RFID tag 504 may include the magnetic field sensing device 650 that receives the interrogatory magnetic signal 552 via a magnetic coil 652. The RFID tag 504 may include the tag antenna 642 for transmitting the response RFID signal 566 and/or receiving the interrogatory RFID signal 564 via the tag antenna 642. The RFID tag 504 may include the magnetic coil 652 for receiving the interrogatory magnetic signal 552.

Figure 7:
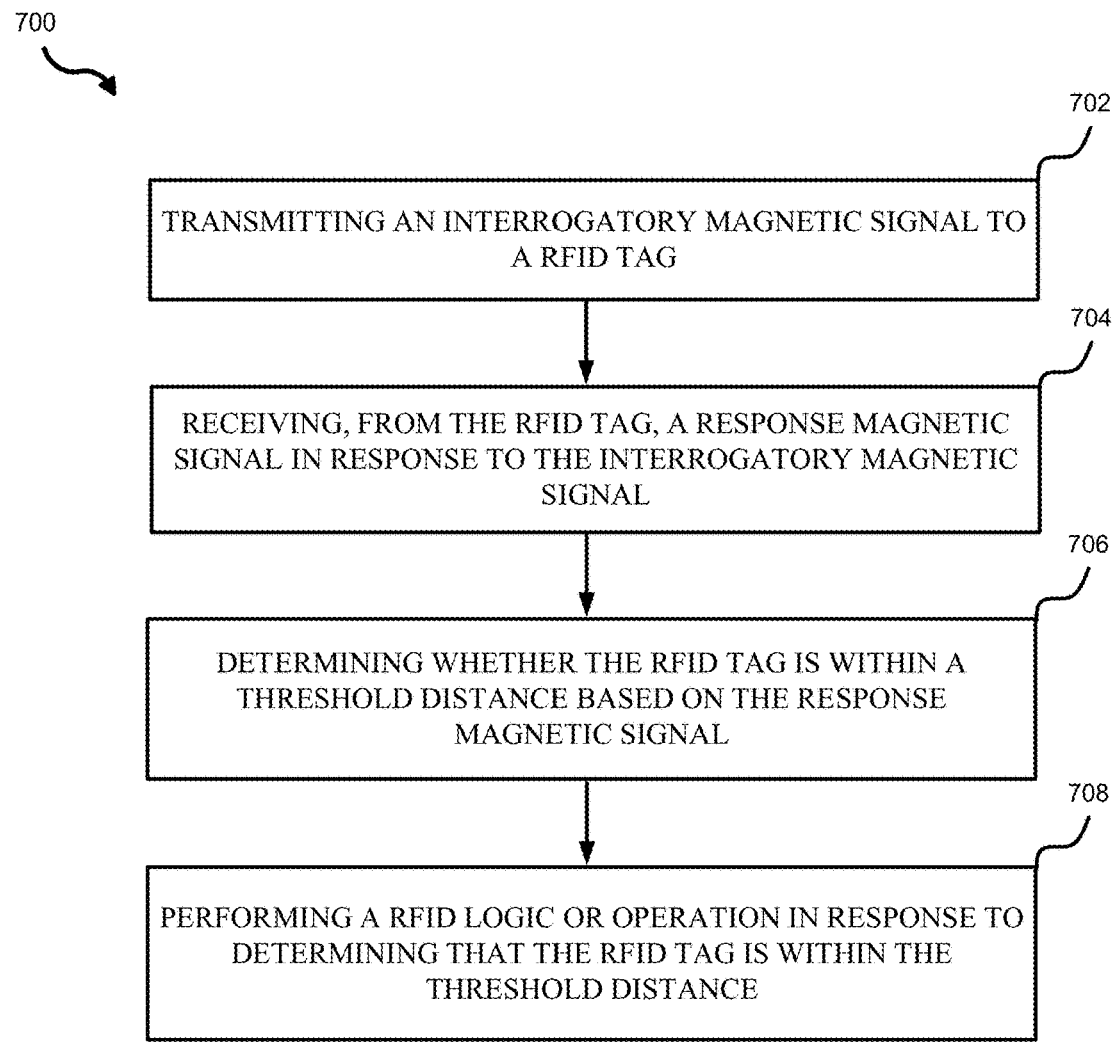
FIG. 7 illustrates an example of a first method for triggering a RFID logic or operation in accordance with aspects of the present disclosure.

Turning to FIG. 7, an example of a method 700 for triggering a RFID logic or operation may be performed by the RFID system 510, such as the processor 610, the memory 612, the RFID component 542, the determination component 544, the RFID driver 620, the reader antenna 622, the RFID reader 512, the magnetic driver 630, the transmitter coil 632, and/or the magnetic signal device 514. The devices listed above may be integrated into a single system, or divided among two or more systems.

At block 702, the method 700 may transmit an interrogatory magnetic signal to a RFID tag. For example, the magnetic driver 630, the transmitter coil 632, and/or the magnetic signal device 514 may transmit the interrogatory magnetic signal 552 to the RFID tag 504. The magnetic driver 630, the transmitter coil 632, and/or the magnetic signal device 514 may be configured to and/or define means for transmitting an interrogatory magnetic signal to a RFID tag.

At block 704, the method 700 may receive, from the RFID tag, a response magnetic signal in response to the interrogatory magnetic signal. For example, the magnetic driver 630, the transmitter coil 632, and/or the magnetic signal device 514 may receive the response magnetic signal 554 from the RFID tag 504. The magnetic driver 630, the transmitter coil 632, and/or the magnetic signal device 514 may be configured to and/or define means for receiving, from the RFID tag, a response magnetic signal in response to the interrogatory magnetic signal.

At block 706, the method 700 may determine whether the RFID tag is within a threshold distance based on the response magnetic signal. For example, the determination component 544 and/or the RFID reader 512 may determine whether the RFID tag 504 is within the threshold distance of the magnetic signal device 514 based on the response magnetic signal. In one example, the determination component 544 and/or the RFID reader 512 may receive an indication from the magnetic signal device 514 indicating the transmission strength 556 and the reception strength 558 of the interrogatory magnetic signal 552. The determination component 544 and/or the RFID reader 512 may determine the distance between the RFID reader 512 and the RFID tag 504 based on the transmission strength 556 and the reception strength 558 of the interrogatory magnetic signal 552. The determination component 544 and/or the RFID reader 512 may compare the distance between the RFID reader 512 and the RFID tag 504 and the threshold distance to determine whether the RFID tag 504 is within the threshold distance of the magnetic signal device 514. The determination component 544 and/or the RFID reader 512 may be configured to and/or define means for determining whether the RFID tag is within a threshold distance based on the response magnetic signal.

In alternative implementations, the magnetic driver 630 of the magnetic signal device 514 may determine the distance between the RFID reader 512 and the RFID tag 504 based on the transmission strength 556 and the reception strength 558 of the interrogatory magnetic signal 552. The magnetic driver 630 of the magnetic signal device 514 may compare the distance between the RFID reader 512 and the RFID tag 504 and the threshold distance to determine whether the RFID tag 504 is within the threshold distance of the magnetic signal device 514. The determination component 544, the RFID reader 512, the magnetic driver 630, and/or the magnetic signal device 514 may be configured to and/or define means for determining whether the RFID tag is within a threshold distance based on the response magnetic signal.

At 708, the method 700 may perform a RFID logic or operation in response to determining that the RFID tag is within the threshold distance. For example, the RFID component 542, the RFID driver 630, the reader antenna 622, and/or the RFID reader 512 may perform a RFID logic or operation in response to determining that the RFID tag 504 is within the threshold distance. The RFID component 542, the RFID driver 630, the reader antenna 622, and/or the RFID reader 512 may be configured to and/or define means for performing a RFID logic or operation in response to determining that the RFID tag is within the threshold distance.

Figure 8:
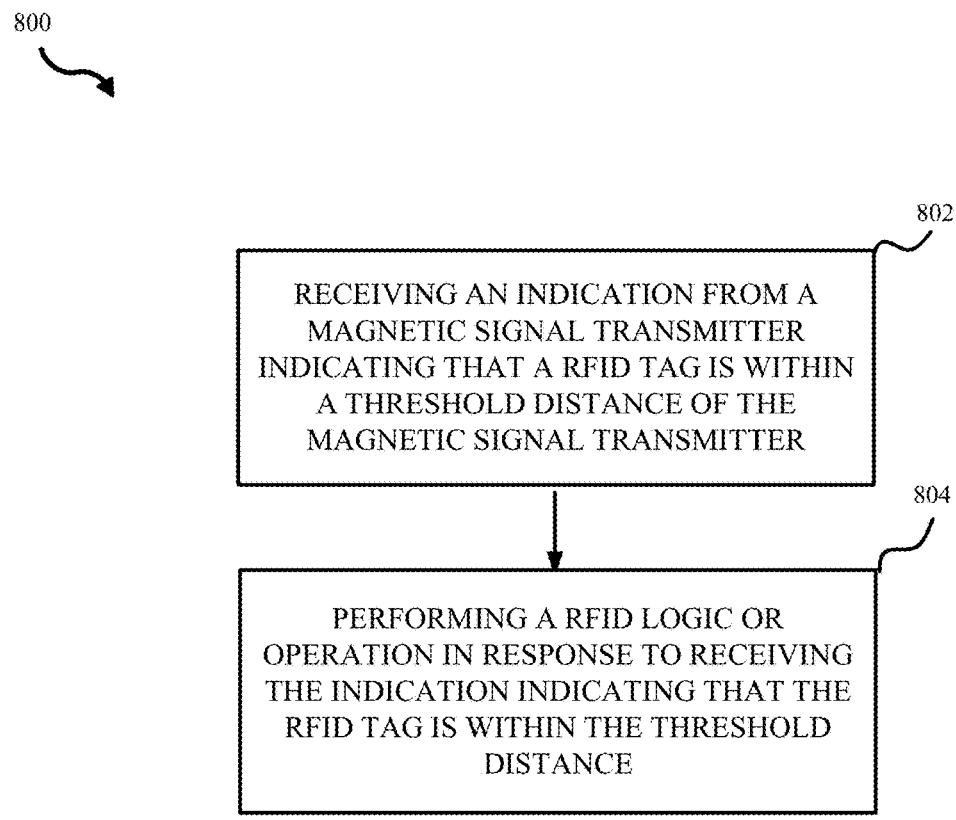
FIG. 8 illustrates an example of a second method for triggering a RFID logic or operation in accordance with aspects of the present disclosure.

Turning to FIG. 8, an example of a method 800 for triggering a RFID logic or operation may be performed by the processor 610, the memory 612, the RFID component 542, the determination component 544, the RFID driver 620, and/or the reader antenna 622 of the RFID reader 512.

At block 802, the method 800 may receive an indication from a magnetic signal device indicating that a RFID tag is within a threshold distance of the magnetic signal device. For example, the processor 610, the memory 612, the RFID component 542, the determination component 544, the RFID driver 620, and/or the reader antenna 622 may receive the indication 562 from the magnetic signal device 514 indicating that the RFID tag 504 is within a threshold distance of the magnetic signal device 514. The processor 610, the memory 612, the RFID component 542, the determination component 544, the RFID driver 620, and/or the reader antenna 622 may be configured to and/or define means for receiving an indication from a magnetic signal device indicating that a RFID tag is within a threshold distance of the magnetic signal device.

At block 804, the method 800 may perform a RFID logic or operation in response to receiving the indication indicating that the RFID tag is within the threshold distance. For example, the processor 610, the memory 612, the RFID component 542, the RFID driver 620, and/or the reader antenna 622 may perform a RFID logic or operation in response to receiving the indicate 562 that the RFID tag 504 is within the threshold distance. The processor 610, the memory 612, the RFID component 542, the RFID driver 620, and/or the reader antenna 622 may be configured to and/or define means for performing a RFID logic or operation.

Figure 9:
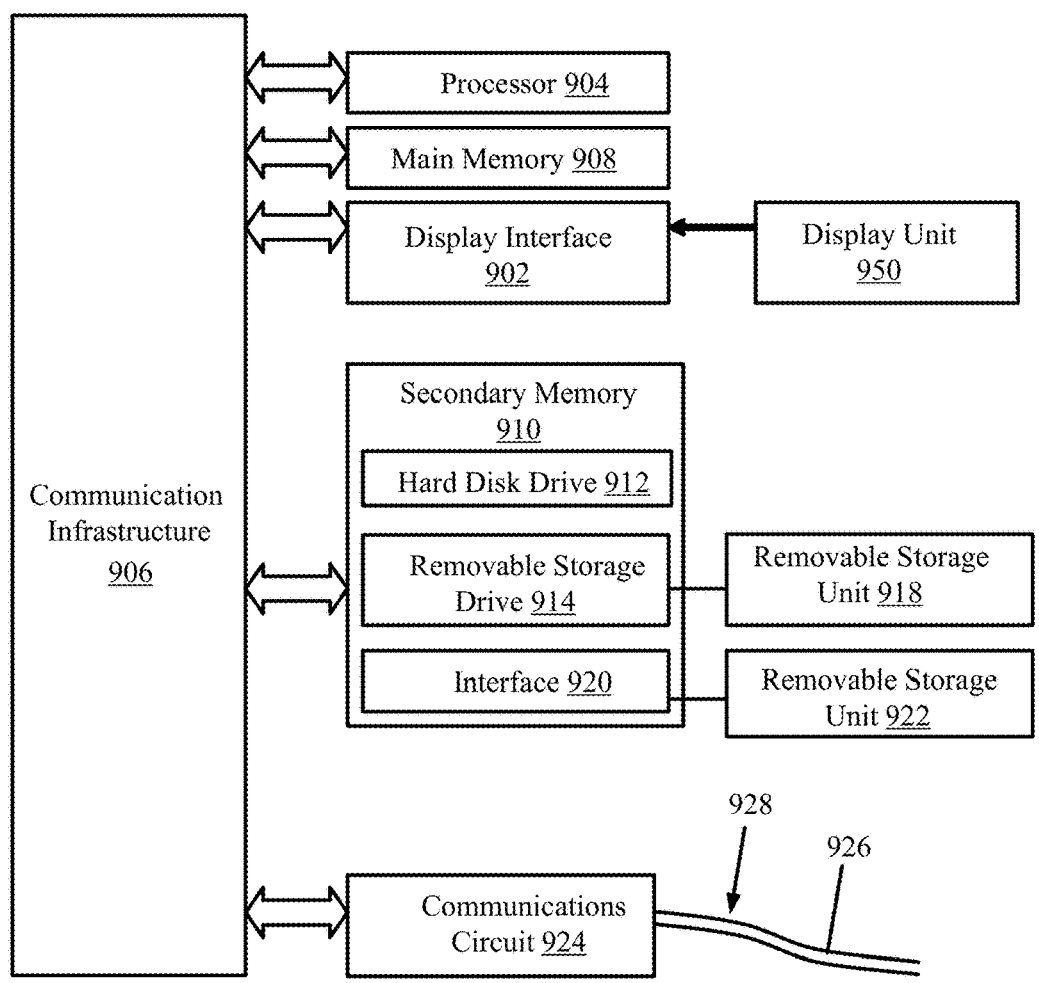
FIG. 9 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the computer system 900 is shown in FIG. 9. In some examples, the RFID scanner 112 and/or the RFID reader 512 may be implemented as the computer system 900 shown in FIG. 9. The RFID scanner 112 and/or the RFID reader 512 may include some or all of the components of the computer system 900.

The computer system 900 includes one or more processors, such as processor 904. The processor 904 is connected with a communication infrastructure 906 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The computer system 900 may include a display interface 902 that forwards graphics, text, and other data from the communication infrastructure 906 (or from a frame buffer not shown) for display on a display unit 950. Computer system 900 also includes a main memory 908, preferably random access memory (RAM), and may also include a secondary memory 910. The secondary memory 910 may include, for example, a hard disk drive 912, and/or a removable storage drive 914, representing a floppy disk drive, a magnetic tape drive, an optical disk drive, a universal serial bus (USB) flash drive, etc. The removable storage drive 914 reads from and/or writes to a removable storage unit 918 in a well-known manner. Removable storage unit 918 represents a floppy disk, magnetic tape, optical disk, USB flash drive etc., which is read by and written to removable storage drive 914. As will be appreciated, the removable storage unit 918 includes a computer usable storage medium having stored therein computer software and/or data. In some examples, one or more of the main memory 908, the secondary memory 910, the removable storage unit 918, and/or the removable storage unit 922 may be a non-transitory memory.

Alternative aspects of the present disclosures may include secondary memory 910 and may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and the removable storage unit 922 and the interface 920, which allow software and data to be transferred from the removable storage unit 922 to computer system 900.

Computer system 900 may also include a communications circuit 924. The communications circuit 924 may allow software and data to be transferred between computer system 900 and external devices. Examples of the communications circuit 924 may include a modem, a network interface (such as an Ethernet card), a communications port, a Personal Computer Memory Card International Association (PCMCIA) slot and card, etc. Software and data transferred via the communications circuit 924 are in the form of signals 928, which may be electronic, electromagnetic, optical or other signals capable of being received by the communications circuit 924. These signals 928 are provided to the communications circuit 924 via a communications path (e.g., channel) 926. This path 926 carries signals 928 and may be implemented using wire or cable, fiber optics, a telephone line, a cellular link, an RF link and/or other communications channels. In this document, the terms "computer program medium" and "computer usable medium" are used to refer generally to media such as the removable storage unit 918, a hard disk installed in hard disk drive 912, and signals 928. These computer program products provide software to the computer system 900. Aspects of the present disclosures are directed to such computer program products.

Computer programs (also referred to as computer control logic) are stored in main memory 908 and/or secondary memory 910. Computer programs may also be received via communications circuit 924. Such computer programs, when executed, enable the computer system 900 to perform the features in accordance with aspects of the present disclosures, as discussed herein. In particular, the computer programs, when executed, enable the processor 904 to perform the features in accordance with aspects of the present disclosures. Accordingly, such computer programs represent controllers of the computer system 900.

In an aspect of the present disclosures where the method is implemented using software, the software may be stored in a computer program product and loaded into computer system 900 using removable storage drive 914, hard disk drive 912, or the interface 920. The control logic (software), when executed by the processor 904, causes the processor 904 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A security tag, comprising:
   a memory;
   a magnetic field sensing device configured to:
      receive a magnetic signal from a magnetic signal transmitter, wherein the magnetic signal includes a transmitter identification associated with the magnetic signal transmitter; and
      determine a strength of the magnetic signal at the security tag; and
   a radio frequency identification (RFID) device configured to:
      receive a RFID interrogatory signal from a RFID scanner;
      transmit a RFID response signal, to the RFID scanner, indicating the strength of the magnetic signal and the transmitter identification.

2. The security tag of claim 1, wherein the memory is configured to store a value associated with the strength of the magnetic signal.

3. The security tag of claim 1, wherein a modulation of the magnetic signal indicates the transmitter identification.

4. The security tag of claim 1, wherein the magnetic signal is an electro-magnetic signal or an acousto-magnetic signal.

5. The security tag of claim 1, wherein the magnetic device is further configured to:
   determine a distance between the security tag and the magnetic signal transmitter based on the strength of the magnetic signal; and
   wherein transmitting the RFID response signal comprises transmitting a value associated with the distance to the RFID scanner.

6. A method by a radio frequency identification (RFID) scanner, comprising:
   obtaining a transmission strength of a magnetic signal transmitted from a magnetic signal transmitter to a security tag;
   transmitting a RFID interrogatory signal to the security tag from the RFID scanner;
   receiving a RFID response signal, from the security tag, indicating a reception strength of the magnetic signal received at the security tag and a transmitter identification associated with the magnetic signal transmitter; and
   determining a distance between the security tag and the magnetic signal transmitter based on the transmission strength of the magnetic signal and the reception strength of the magnetic signal.

7. The method of claim 6, wherein determining the distance comprises:

determining a difference between the transmission strength of the magnetic signal and the reception strength of the magnetic signal; and determining a square root or a cube root of the difference.

8. The method of claim 6, further comprising:

obtaining a second transmission strength of a second magnetic signal transmitted from a second magnetic signal transmitter to the security tag;

obtaining a third transmission strength of a third magnetic signal transmitted from a third magnetic signal transmitter to the security tag;

receiving a second RFID response signal, from the security tag, indicating a second reception strength of the second magnetic signal received at the security tag;

receiving a third RFID response signal, from the security tag, indicating a third reception strength of the third magnetic signal received at the security tag;

determining a second distance between the security tag and the second magnetic signal transmitter based on the second transmission strength and the second reception strength of the second magnetic signal;

determining a third distance between the security tag and the third magnetic signal transmitter based on the third transmission strength and the third reception strength of the third magnetic signal; and determining a position of the security tag based on the distance, the second distance, and the third distance.

9. The method of claim 6, wherein the magnetic signal is an electro-magnetic signal or an acousto-magnetic signal.

10. The method of claim 6, further comprising:

determining whether the distance smaller than or equal to a threshold distance; and performing a RFID logic or operation in response to determining that the distance is smaller than or equal to the threshold distance.

11. A method by a radio frequency identification (RFID) system, comprising:

transmitting an interrogatory magnetic signal to a RFID tag;

receiving, from the RFID tag, a response magnetic signal in response to the interrogatory magnetic signal;

determining whether the RFID tag is within a threshold distance based on the response magnetic signal; and in response to determining that the RFID tag is within the threshold distance:

transmitting an interrogatory RFID signal to the RFID tag; and receiving, from the RFID tag, a response RFID signal in response to the transmitted interrogatory RFID signal.

12. The method of claim 11, wherein the response RFID signal includes at least one of merchandise information, tag information, or pricing information.

13. The method of claim 11, further comprising transmitting an unlocking signal to the RFID tag to unlock the RFID tag from a merchandise item.

14. The method of claim 11, wherein the interrogatory magnetic signal is an electro-magnetic signal or an acousto-magnetic signal.

15. The method of claim 11, wherein determining whether the RFID tag is within the threshold distance comprises:

determining a tag distance between the RFID tag and at least a portion of the RFID system based on an amplitude of the response magnetic signal; and determining whether the tag distance is less than the threshold distance.

16. The method of claim 15, wherein determining the tag distance comprises determining the tag distance based on a transmission strength of the interrogatory magnetic signal and a reception strength of the interrogatory magnetic signal.

17. The method of claim 15, wherein determining the tag distance comprises determining the tag distance based on a transmission strength of the response magnetic signal and a reception strength of the response magnetic signal.

18. A radio frequency identification (RFID) system, comprising:

a magnetic signal device configured to:

transmit an interrogatory magnetic signal to a RFID tag; and receive, from the RFID tag, a response magnetic signal in response to the interrogatory magnetic signal; and a RFID reader configured to:

determine whether the RFID tag is within a threshold distance based on the response magnetic signal; and in response to determining that the RFID tag is within the threshold distance:

transmitting an interrogatory RFID signal to the RFID tag; and receiving, from the RFID tag, a response RFID signal in response to the transmitted interrogatory RFID signal.

19. The RFID system of claim 18, wherein the response RFID signal includes at least one of merchandise information, tag information, or pricing information.

20. The RFID system of claim 18, wherein the RFID reader is further configured to transmit an unlocking signal to the RFID tag to unlock the RFID tag from a merchandise item.

21. The RFID system of claim 18, wherein the interrogatory magnetic signal is an electro-magnetic signal or an acousto-magnetic signal.

22. The RFID system of claim 18, wherein determining whether the RFID tag is within the threshold distance comprises:

determining a tag distance between the RFID tag and at least a portion of the RFID system based on an amplitude of the response magnetic signal; and determining whether the tag distance is less than the threshold distance.

23. The RFID system of claim 22, wherein determining the tag distance comprises determining the tag distance based on a transmission strength of the interrogatory magnetic signal and a reception strength of the interrogatory magnetic signal.

24. The RFID system of claim 22, wherein determining the tag distance comprises determining the tag distance based on a transmission strength of the response magnetic signal and a reception strength of the response magnetic signal.

* * * * *